United States Patent [19]

Hedke et al.

[11] 4,248,583

[45] Feb. 3, 1981

[54] BLOW-MOLDING UNIT FOR SYNTHETIC PLASTIC MATERIALS

[75] Inventors: Manfred Hedke; Uve-Volker Roos, both of Bodenteich; Hermann Reuel, Berlin, all of Fed. Rep. of Germany

[73] Assignee: Bekum Maschinenfabrik GmbH, Berlin, Fed. Rep. of Germany

[21] Appl. No.: 954,559

[22] Filed: Oct. 25, 1978

Related U.S. Application Data

[63] Continuation of Ser. No. 786,814, Apr. 12, 1977, abandoned, which is a continuation of Ser. No. 629,081, Nov. 5, 1975, abandoned.

[30] Foreign Application Priority Data

Nov. 14, 1974 [DE] Fed. Rep. of Germany ... 7437975[U]

[51] Int. Cl.³ ..................... B29C 1/16; B29C 17/07
[52] U.S. Cl. .................. 425/541; 425/450.1; 425/451.9
[58] Field of Search ............... 425/450.1, 451, 451.9, 425/541, 542, 595, 451.2–451.7

[56] References Cited

U.S. PATENT DOCUMENTS

| 2,319,479 | 5/1943 | Ryder | 425/451.9 |
| 2,916,768 | 12/1959 | Quere et al. | 425/451.9 |
| 3,277,534 | 10/1966 | McDonald et al. | 425/541 |
| 3,608,152 | 9/1971 | Fink et al. | 425/451.9 X |
| 3,825,396 | 7/1974 | Kontz | 425/451 |
| 3,964,852 | 6/1976 | Marfiewicz | 425/451.9 |

FOREIGN PATENT DOCUMENTS

| 2027934 | 12/1971 | Fed. Rep. of Germany | 425/451.9 |
| 2100868 | 7/1972 | Fed. Rep. of Germany | 425/541 |
| 2321694 | 11/1974 | Fed. Rep. of Germany | 425/450.1 |
| 111409 | 8/1944 | Sweden | 425/542 |

*Primary Examiner*—Jan H. Silbaugh
*Attorney, Agent, or Firm*—Michael J. Striker

[57] ABSTRACT

The novel blow molding unit has mold sections movable toward and away from each other between open and closed positions. A motion-imparting arrangement is coupled with the mold sections for moving them between these positions. A clamping arrangement is located upwardly of the points where the motion-imparting arrangement is coupled with the mold sections and serves to bias the mold sections towards one another either when they are in the closed position or just before they reach the same.

8 Claims, 7 Drawing Figures

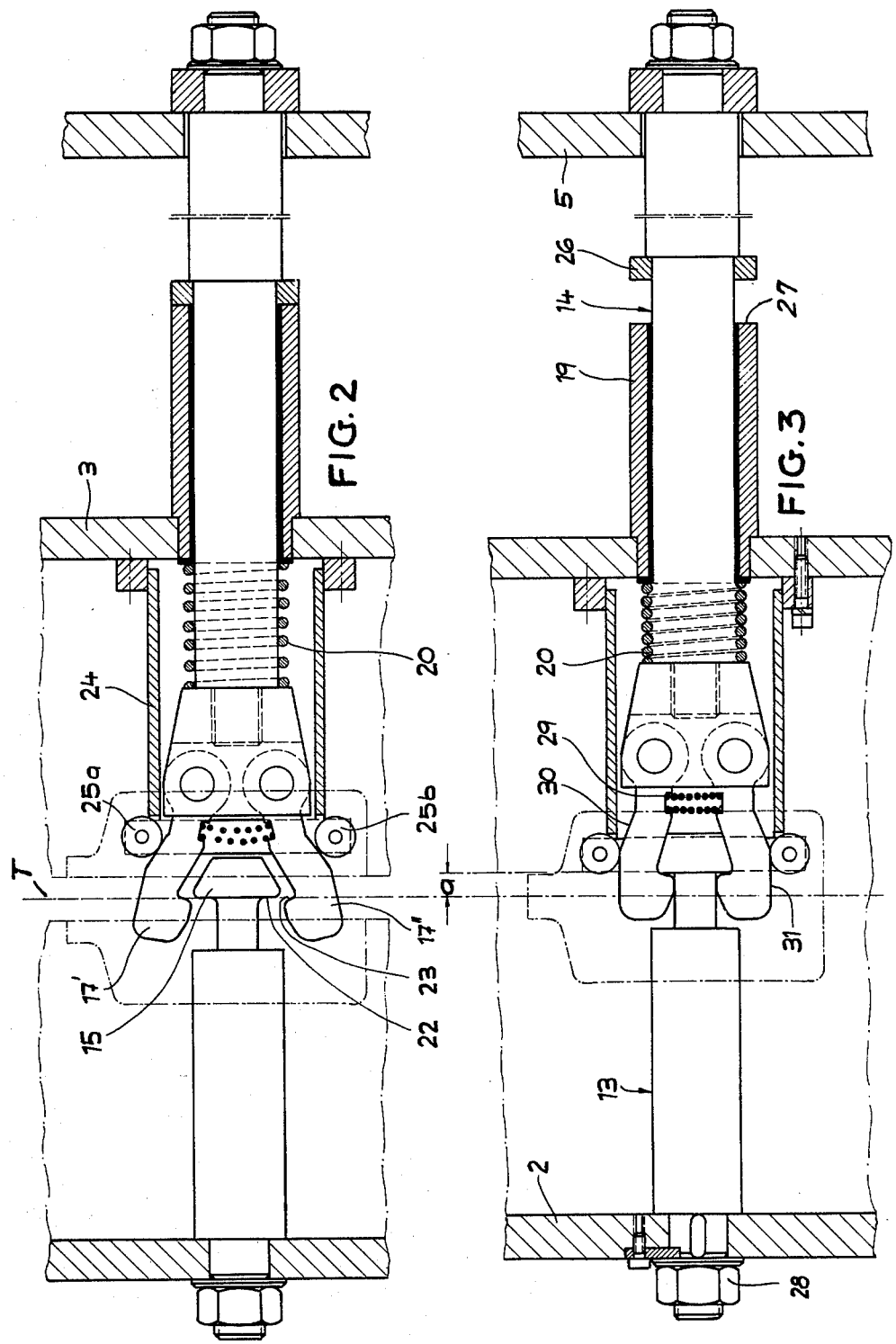

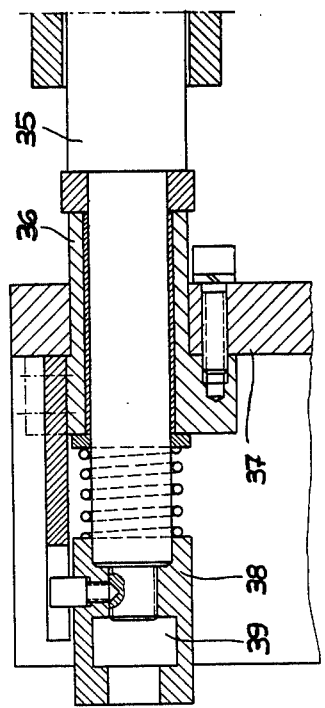
FIG. 4
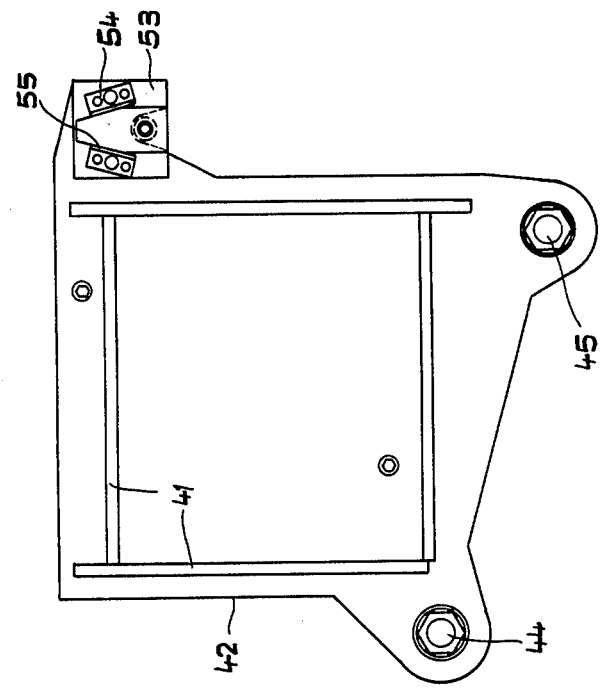
FIG. 7
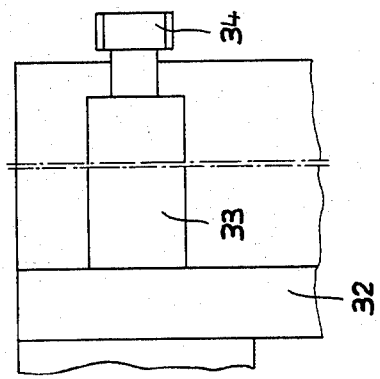

BLOW-MOLDING UNIT FOR SYNTHETIC PLASTIC MATERIALS

This is a continuation of application Ser. No. 786,814, filed Apr. 12, 1977, now abandoned, which is a continuation of application Ser. No. 629,081, filed Nov. 5, 1975, now abandoned.

BACKGROUND OF THE INVENTION

The present invention relates to a blow-molding unit for synthetic plastic materials.

Hollow bodies of synthetic plastic materials can be produced, inter alia, by blow molding. If they are produced in this manner, they are usually manufactured in partable mold sections from an extruded preform, in such a manner that an overpressure is produced in the interior of the preform to expand the latter into engagement with the walls of the mold sections which bound an internal mold cavity. As a general rule it is desired that the mold sections be replaceable for repair or other reasons. Because of this, the mold sections are usually mounted on supporting plates. The closure mechanism which moves the supporting plates with the mold sections into mold-closing position or out of the same, engages special closure plates on which the support plates are mounted, or on which the mold sections themselves are mounted directly.

In more recent developments of the blow molding technique a two-stage or multi-stage approach is utilized in which a form composed of mold sections in open position is placed at a receiving station and has admitted into it a preform from the outlet nozzle of an extruder. The form is then closed around the preform and is moved to a blowing station where the preform is expanded to the desired shape. During this time the extruder nozzle extrudes another preform in tubular or other configuration in preparation for a new working cycle. This means that the blow mold composed of the mold sections operates both in a receiving station and in a blowing station and shuttles between these two stations.

It is already known to increase the strength of a blow-molded body of synthetic plastic material, without requiring additional quantities of material, by subjecting the article to so-called "biaxial stretching". When this approach is used, it is known to use a premold in which the preform is shaped to approximately the size and configuration of the desired final article, and wherein this preform is then shaped in a final mold to the final shape and configuration desired for the article. This is, for example, disclosed in German Offenlegungsschrift No. 2,354,214.

As a rule, the two mold sections of a blow mold are not separately driven. It is customary to use guide members which usually carry one of the support or closure plates rigidly connected to them, whereas the other support or closure plate is slidable along the guide members toward and away from the first-mentioned support or closure plate. Each of the plates, of course, can raise one of the mold sections. To obtain an exact guidance for the mold sections it has previously been customary to use four guide members which extend through the corners of the respective support plates or closure plates. If the mold sections are moved in a horizontal or inclined path, which may even be slightly curved, this brings with it the disadvantage that at least one of the guide members will always be in the way when the opened mold section is moved from the blow molding position to the receiving position beneath the extruder nozzle from which already a length of plastic tubing or the like extends as a preform.

To overcome this disadvantage it is already known from the prior art to eliminate at least one of the guide members, namely the one which is located uppermost relative to the direction of movement of the mold sections towards the extruded preform. During the movement of the mold from the blowing position to the preform receiving position, this omitted guide member then cannot be in the way, so that despite the fact that a portion of extruded synthetic plastic material constituting the preform hangs from the extruder nozzle, the mold sections of the blow mold can move to the proper receiving position, also known as the mold charging position. It has also become known to provide mounting plates or closure plates carrying the mold sections, wherein two diagonally opposite corners are provided with the guide members, the corners being so selected that the aforementioned interference with the movement does not occur.

However, if the blow mold is a premold in which a preform is first expanded at a premolding station, which must then be received in a final mold and further expanded to the finished article, the guide member which is located remote from the extruder nozzle would not push away the extruded preform hanging from the extruder nozzle during the movement of the mold from the blowing position to the charging position, but the other upper guide member would during this movement impact against the premold which is produced at the charging or premolding station and which depends from the blowing mandrel in readiness for engagement and transfer to the final blowing station. The same is true of the so-called directed transfer of a blow molded hollow body in the final blow molding station, in which for example the hollow body is moved downwardly by the blow molding mandrel after the final mold is open, and is placed onto a stationary or movable supporting surface, as for instance disclosed in German Offenlegungsschrift No. 2,355,114.

It will be appreciated that in the latter case there will be a longer time before the blowing mandrel has been withdrawn sufficiently far into its readiness position for the next-following blowing cycle, that it is entirely withdrawn out of the path of movement of the blow mold. During this time, the open blow mold would have to remain stationary at the final blowing station. This is a disadvantage in terms of the production capabilities and to overcome this disadvantage it is known to utilize for the opening and closing movements of the sections of the blow mold only two guide members which are located outside and below the support or closure plates of the mold, via which the mold sections are guided directly or indirectly by means of the supporting plates, as disclosed in German Offenlegungsschrift No. 2,321,694. However, in that case after the mold sections have moved to closed position, they will not be part of a force system which is in such equilibrium that it can properly withstand the internal pressure that is applied when the article inside the mold sections is expanded. In other words, in such a set-up there is the danger that due to the pressure which develops during the expansion of the article in the mold composed of the mold sections, the mold sections will be urged apart and the guide members for them might become bowed or buckled. This means that the guide members must be made exceptionally strong in relationship to the other components.

SUMMARY OF THE INVENTION

It is an object of this invention to overcome the disadvantages of the prior art.

More particularly, it is an object of the present invention to provide an improved blow-molding unit for synthetic plastic materials in which the internal pressure developing in a closed blow mold during expansion of an article or parison therein, will not be able to move the mold sections apart and/or cause bowing or other deformation of the guide members for the mold sections.

A further object of the invention is to provide such an improved blow-molding unit which, despite the advantages outlined above, does not interfere with the movement of the mold sections relative to a preform or other synthetic plastic element which is to be received within the mold sections, nor interfere with the movement of a preform, parison or any other component on a blowing mandrel.

In keeping with these objects, and with others which will become apparent hereafter, one feature of the invention resides in a blow-molding unit for synthetic plastic materials which, briefly stated, comprises mold sections movable toward and away from each other between open and closed positions, motion-imparting means coupled with the mold sections for moving them between these positions, the clamping means located upwardly of the points where the motion-imparting means is coupled with the mold sections. The clamping means is operative for biasing the mold sections towards one another at least when the mold sections have arrived at the closed position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a fragmentary, partly sectioned detail view of components of the embodiment in FIG. 1;

FIG. 3 shows the components of FIG. 2 in closed or arresting position;

FIG. 4 is a fragmentary detail view, showing components of a further embodiment of the invention;

FIG. 7 is a side view of the arrangement in FIGS. 5 and 6.

DESCRIPTION OF THE PREFERRED EMBODIMENTS

Figure 1:
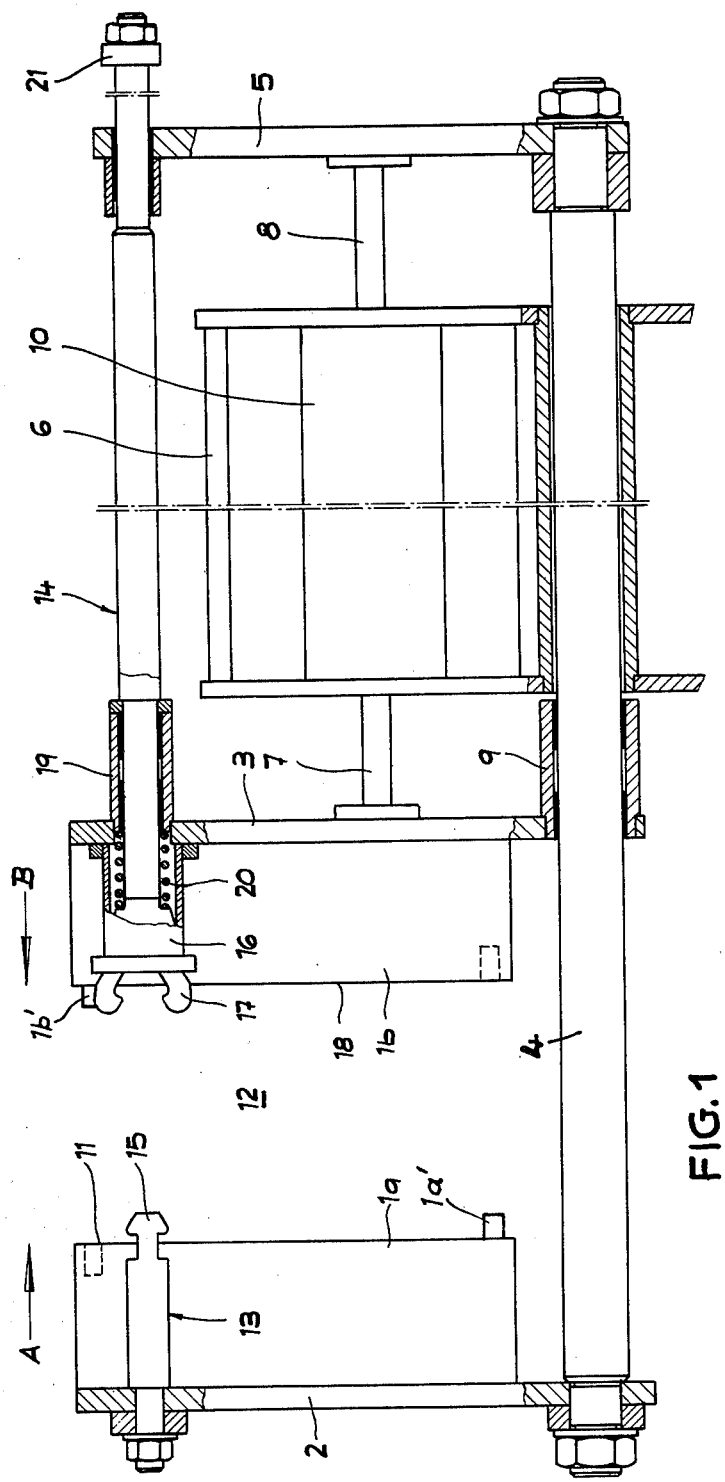
FIG. 1 is a simplified reduced-scale front view of a blow-molding unit embodying the invention.

Discussing now firstly the embodiment in FIGS. 1-3 it will be seen—and this is generally true of the embodiments herein—that a blow-molding unit according to the invention has the mold sections 1a and 1b which are usually removably mounted on not illustrated supporting plates, or else directly on the illustrated closure plates 2 and 3, respectively. The mold sections 1a and 1b are guided and moved via the closure plates 2, 3 by means of guide members 4 which are located downwardly with reference to the mold sections 1a and 1b, outside the exterior confines of the latter, and either are located in a common plane or else at different planes.

The closure plate 2 which is associated with the mold section 1a (i.e. the left-hand closure plate 2 in FIG. 1) is connected with a support element 5 so that any movement of the support element 5 in the direction of the arrows A and B is necessarily transmitted to the closure plate 2. A closure mechanism, designated generally with reference numeral 6, is provided intermediate the closure plate 3 and the support 5. In known manner, and via an element 7, the mechanism 6 effects movement of the plate 3, and via the element 7 it effects movement of the support 5 in the direction of the arrows B or A. The plate 3 is shiftably guided on the guide members 4 by means of sleeves 9.

When the motor 10 transmits via the element 7, for example a piston rod, movement to the plate 3 causing the same to move in the direction of the arrow B, and if the support 5 is moved in the direction of the arrow A via the element 8, for example a further piston rod, then the two mold sections 1a and 1b move towards one another until the mold is in closed position. In the same manner the mold sections 1a and 1b are moved apart from one another so that the mold opens, the movement of course being the reverse of that described above.

When the mold is in closed position, and closure pressure acts upon the mold sections 1a and 1b via the plates 2 and 3 from the motor 10, in a sense moving the closure plates 1a and 1b together, and on the inside of the mold the expansion pressure acts which operates to expand an article in the mold, the system of forces active in the plate 2, the guide members 4 and the plate 3 is not in equilibrium. The result is that at the open side of this force quadrant, especially at high blowing pressures, the form tends to separate at the upper region of contact of the mold sections 1a and 1b, that is in the region 11. In order to overcome this, and also in order to maintain the space 12 between the separated mold sections 1a and 1b free during the movement of the opened mold, for example so as to permit the entry into the mold of a preform expressed from the extruder, the invention provides for a clamping or locking arrangement which completes the force quadrant mentioned above and which begins to act only at the time at which the necessary closure force is required, i.e. at the time when the mold sections 1a and 1b are either in closed position or when they are almost in closed position.

In the illustrated embodiment of FIGS. 1-3 this arrangement is in form of a divided tie rod, having two parts each of which is associated with one of the mold sections 1a, 1b. These parts are so arranged and dimensioned that when the mold composed of the sections 1a and 1b is in opened condition, their free ends do not project beyond the parting surfaces of the mold sections 1a, 1b, i.e. the surfaces at which the mold sections engage when the mold is closed, or project at most slightly beyond these surfaces. In the illustrated embodiment the tie rod has a fixed part 13 and a slidable part 14 both of which engage one another in a locking relationship to form a unitary upper guide member which is capable of withstanding the forces that occur as a result of the internal mold pressure, but which engage only when the mold sections 1a, 1b are in closed position or just shortly before they are in closed position.

The free end of the fixed part 13 is provided with a head 15 and the free end of the part 14 is provided with a head 16 having jaws 17. The jaws 17 and the head 15 may extend slightly beyond the parting surfaces 18 of the mold sections 1a, 1b because this does not disadvantageously influence the availability of the space 12 since as a rule the dowel pins 1a', 1b' of the mold sections 1a, 1b project slightly beyond these surfaces 18 in any case. Thus, the parts 13 and 14 permit the movement of the mold sections when the mold sections 1a and 1b are in open position, even if preforms, parisons, finished bodies and/or blowing mandrels extend into the path of movement of the mold, and despite this provide a high closing force for the mold sections 1a, 1b when the latter is in closed position, without any necessity for the guide members 4 to be reinforced beyond the desirable or reasonable limit to absorb these forces.

When the machine control issues the "closing" command, the support 5 and thus the plate 2 with the mold section 1a is moved in the direction of the arrow A, and the plate 3 with the mold section 1b moves in the direction of the arrow B. The member 14 is guided in a sleeve 19 that is mounted on the plate 3 and which takes along the member 14 with the head 16 thereof in the direction towards the head 15, for which purpose an elastic element, for example a spring 20 is provided which serves to transmit the necessary motion. When the cooperating mold section faces 18 have a certain distance from one another, for example when they have approached to 20 millimeters, the support 5 engages the rear portion 21 of the member 14, and the jaws 17' and 17" which are normally held in open position (as illustrated in FIGS. 1 and 2) then have reached a position in which the cooperating retaining faces 22 and 23 on the head 15 and the jaws 17', 17" are in engagement with one another and are located in the plane T, so that the clamping arrangement is in clamping position as shown in FIG. 3.

The plate 3 carries a member 24 which surrounds the jaws 17 and the spring 20 and which carries at its open end respective rollers 25a and 25b which act upon the jaws 17' and 17". The further closure movements cause the rollers 25a and 25b to push the jaws 17' and 17" towards closed position, i.e. from the FIG. 1 position to the FIG. 3 position, and this causes the clamping that is desired. The parts 13 and 14 of the tie rod are so constructed that the position shown in FIG. 2, in which the faces 22 and 23 are ready for cooperative interengagement, is already reached before the mold is entirely closed, i.e. before the plates 2 and 3 have reached the position shown in FIG. 3. However, since the plate 2 and the support 5 are rigidly connected with one another via the guide members 4, the plate 2 being shiftable in the direction of the arrow A and at the same time the plate 3 being shiftable in the direction of the arrow B from the position shown in FIG. 2 until they reach the position shown in FIG. 3, the plate T defined by the cooperating faces 22 and 23 also shifts in the direction towards the plate 3 by the distance a. This causes the spring 20 to be tensioned by double the previous value and the center abutment 26 to be lifted off by this distance from the end face 27 of the sleeve 19. The necessary play between the faces 22 and 23 can be precisely predetermined by setting the fixed part 13 via the nut 28.

The disengagement of the parts 13 and 14 for opening of the mold is effected in reverse manner when the plates 2 and 3 are moved apart from one another. When the member 24 with the plate 3 moves in the direction of the arrow A and the rollers 25a, 25b are moved away so far that they disengage the jaws 17' and 17" which are then pressed to open position by the spring 29, the member 14 does not yet participate in this movement. Initially it remains in its position and the spring 20 relaxes by the amount 2×a so that via the abutment 21 the engagement with the support 5 remains maintained. Only when the end face 27 of the sleeve 19 engages the center abutment 26, will the jaws 17' and 17" be fully opened and disengage the head 15. From this position on further movement of the plate 3 in opening sense causes the member 14 to move until it reaches the position shown in FIG. 1.

The spring 20 which is tensioned between the sleeve 19 and the head 16 serves to store energy and also to in effect "store distance" for the reasons explained above. In particular it assures that the clamping means or coupling can close even before the mold 1a, 1b is fully closed, so that at the moment of an internal pressure increase the tie rod composed of the parts 13 and 14 will be complete, being located above a plane passing through elements 7 and 8 and be capable of withstanding tensile forces resulting from the pressure increase in the interior of the mold.

Certain differences in the thickness of the mold sections can be compensated by the cam tracks 30 of the jaws 17' and 17". In case of the thickest mold section to be expected, the rollers 25 have thus reached the faces 31 of the cam tracks 30 which in the closed position are parallel to one another, as shown in FIG. 3, whereas in the case of thinner mold sections the rollers 25, 25a shift along the parallel faces 31 by a distance corresponding to the difference between the thickest and thinnest mold section.

The tie rod 13, 14 can of course be moved to biasing or clamping position in a manner different than the one illustrated, for example by appropriate electrical, pneumatic or hydraulic control elements, or by other elements known in the art, particularly in the blow-molding art.

FIGS. 1–3 show an advantageous embodiment of the invention which has been tried and found highly successful in actual practice. However, there are evidently many other possibilities besides the one in FIGS. 1–3. For example, a locking engagement from the interior could be incorporated in the embodiment of FIGS. 1–3, by means of locing pins or the like instead of utilizing the jaws 17', 17".

One such further embodiment is illustrated diagrammatically in FIG. 4 where it will be seen that a head 33 with a turnable arresting member 34 is mounted on the closure plate 32. The arresting member 34 may for example have the form of a plate which is provided with flat facets at two opposite sides, that is at two opposite diametric sides, and which can be turned alone or together with the member 33 by any desired hydraulic, electrical, pneumatic or mechanical device. A member 35 corresponding to the member 14 of FIGS. 1–3 and being guided in a sleeve 36 of the plate 37, has an arresting sleeve 38 secured to it, by threading or otherwise, which is formed with a recess 39 into which the member 34 can enter and wherein it becomes arrested after it is turned through 90°. In this embodiment also the arresting can be accomplished before the form is completely closed, and the sleeve 38 and the member 34 may also extend to a certain distance beyond the parting faces of the mold sections carried by the respective plates.

Another way of maintaining free the upper region between the plates would be to mount the member 35 in FIG. 4 fixedly on the plate 37, but such that it can be adjusted. At the free end there is provided, as shown in FIG. 4, an arresting sleeve 38 which also extends to a certain extent beyond the parting plane of the mold sections 1a and 1b. The member 33 mounted on the plate 32 with its arresting member 34 is then stressed in axial direction after the locking is accomplished, via a stressing device such as a so-called stressing nut, in such a manner that the full closure pressure is obtained by the force quadrant which is thus completed.

The tension rods of FIGS. 1-4 can be used singly or in pairs, and if they are used in pairs they can be located in a common plane or in different planes, and they may be located in the same vertical planes as the guide members for the closure plates, or in different vertical planes.

Figure 5:
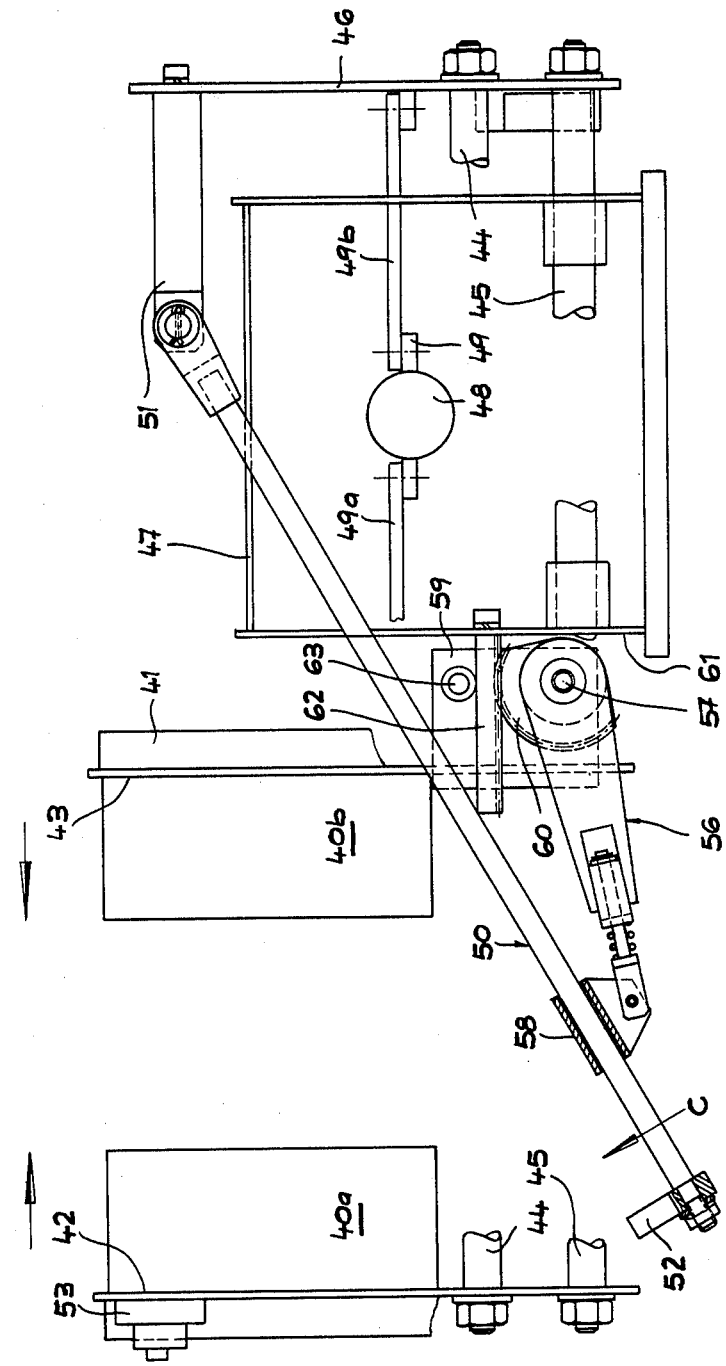
FIG. 5 is a front view illustrating an additional embodiment of the invention in one operating phase.
Figure 6:
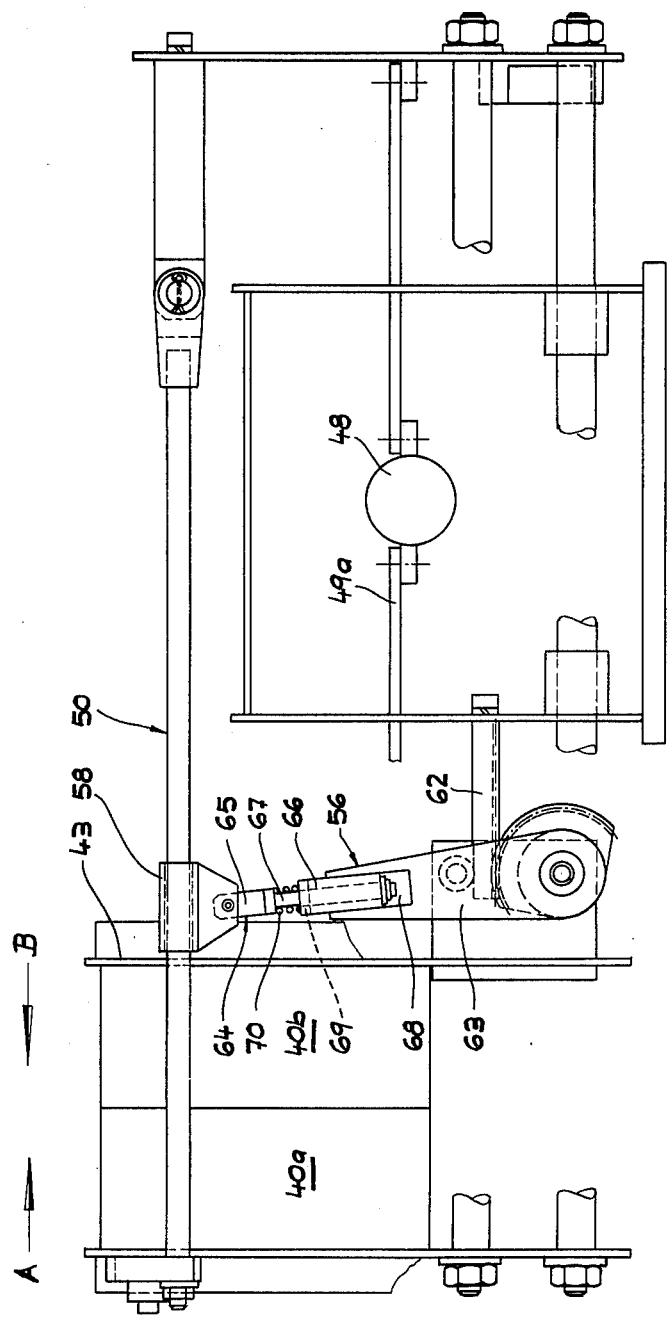
FIG. 6 shows the arrangement of FIG. 6 in a successive operating phase following the one in FIG. 5.

A final exemplary embodiment of the invention is illustrated in FIGS. 5-7. According to this embodiment two closure plates 42 and 43 are reinforced by ribs 41 and carry the mold sections 40a and 40b. They are guided by guide members 44 and 45 located at different levels or planes, and these guide members are connected with a support or traverse member 46 in the known and already described manner. A motor 48 is mounted on the front wall of the housing 47 and has a piston rod which reciprocates a member in a plane transverse to the plane of the drawing. This member is provided with projections 49 on which levers 49a and 49b are pivoted having free ends that are pivoted to the member 46 or the plate 43, respectively. This closure system effects, during a movement of the piston rod of the motor 48 in the direction towards the plane of the drawing, a closure movement of the mold sections 40a and 40b, whereas it moves the mold sections apart from one another when the piston rod of the motor 48 is retracted out of the plane of the drawing.

In addition to the guide members 44 and 45 there is provided a tension rod 50 which is pivotally mounted on a projection 51 of the member 46. At its free end the member 50 is provided with a hammerhead-shaped part 52 which engages behind the arresting plate 53 provided laterally on the plate 42, becoming wedged between two clamping jaws 54 with rubber or synthetic plastic coatings 55. The member 50 is pivotable from the position of FIG. 5 into the arresting position or clamping position of FIG. 6 by means of a drive system which in the illustrated embodiment utilizes a pivotable arm 56 one end of which is turnably mounted on the shaft 57 and the other end of which is articulated to a slidable member 58 which is mounted on the member 50. The shaft 57 is mounted in a console 59 secured to the plate 43 and in addition carries a tooth segment 60 which meshes with a rack 62 secured on the side wall 61 of the housing 47. A guide roller 63 is mounted on the console 59 and serves for the vertical guidance of the rack 62.

When the mold sections 40a, 40b move towards closed position, the member 50 is moved upwardly in the direction of the arrow C, and when they move towards open position it is moved downwardly in the opposite direction to the arrow C. It will be clear that when the plate 43 is moved in the direction of the arrow B via the arm 49b that is pivoted to the plates 43, the console on the plate 43, which console is identified with reference numeral 59, also moves the shaft 57 so that the toothed segment 60 rolls on the rack 62. This causes the arm 56 to undergo a movement which constitutes a superimposition of the translatory movement in the direction of the arrow B and the pivotable movement in the direction of the arrow C, so that the member 50 is lifted to the illustrated position, shifting the member 58 at the same time.

In this case, also, the turning movement of the arm 56 is so adjusted that the member 50 will already be in the arresting or clamping position of FIG. 6 before the mold sections 40a, 40b are fully in closed position and before the closure force can develop via the arms 49. Different mold section thicknesses can also be compensated for in this manner.

For this purpose the arm 56 is composed of a fixed part which is identified with the reference numeral 56 and a part 64 which is axially movable relative to the fixed part 56. In the illustrated embodiment the fixed part is composed of a bifurcated member 65 and a rod 67 which is guided between two plates 66 that are welded in place laterally of the arm 56, the rear ends of the plates 66 constituting an abutment for the end of the bifurcated member 67 in a recess of the arm 56. An energy storing element, for example a spring 70 or a packet of Belleville springs, is compressed between the bifurcated member 65 and the member 69. This makes it possible to change the length of the arm 56 so that during the closing of the mold it can perform a further turning movement beyond what would be possible if the length would not be adjustable. The invention, in the illustrated exemplary embodiments or in others that will offer themselves to those skilled in the art, has the advantage that it is now possible to move the open mold in its predetermined path of movement without having to worry about elements or components that extend into this path of movement. For example, in the case of a two-stage blow molding operation the open mold could already move from the final molding station (after the final molding operation is completed and the mold has been opened) to the pre-molding station while the final-molded hollow body still hangs off the blowing mandrel, for example to cool.

This advantage is particularly helpful in the case of a three-stage blow molding operation in which a parison is continuously extruded in tubular form from the nozzle of an extruder, which is premolded to form a pre-molded body in a premolding station as the second stage of operation, and which is then surrounded by the mold sections of a final blowing mold which now assumes the position previously inhabited by the premold. When the invention is incorporated in such a structure, the mold sections of the premold are then open on two sides, so that they can move out of the position previously assumed and to the first-stage position to engage the extruded tubular parison without interfering with the same and also without interfering with the premolded body that hangs off the blowing mandrel, despite the fact that at the moment of blow molding in planes above and below the plane in which the mold closing force is exerted via the closure plates, elements are present which withstand the internal blow-molding pressure and thus avoid an increased stressing of the guide members for the mold sections and a moving-apart of the mold sections. This makes it possible, for example, to omit an articulated mounting of the mold sections or mold support plates to the mold closure plates.

The same advantages are obtained in the case of a three-stage blow molding operation for the final mold, for example if in the so-called directed transfer the blowing mandrel has been moved downwardly in direction towards the article supporting surface and it is at this time already desired to move the mold out of the final blow molding station. Just as in the case of the two-stage operation the free space (e.g. 12 in FIG. 1) between the mold sections is necessary and must not be obstructed by any mold section clamping devices, if in the three-stage blow molding operation it is desired to move the mold sections out of the final mold station while the finished-blown article still hangs down from the blowing mandrel at the time of movement of the mold sections.

It will be understood that each of the elements described above, or two or more together, may also find a useful application in other types of constructions differing from the types described above.

While the invention has been illustrated and described as embodied in a blow-molding unit for synthetic plastic materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a blow-molding unit for blow-molding synthetic plastic objects, a combination comprising a pair of assemblies, each including an upright mold section and a lower part below said mold section; guide means extending through at least one of said lower parts and being operative for guiding said assemblies in substantial parallelism toward and away from each other between a closed position in which said mold sections meet in an upright parting plane and confine a synthetic plastic object between themselves, and an open position in which said mold sections define between themselves a free space and in which free relative movement of said mold sections and of the object in a predetermined direction can occur so that the object is no longer confined between said mold sections; single motion-imparting means coupled with said assemblies located outside said free space above said guide means and operative for moving said assemblies between said open and cosed positions of said mold sections and for producing, when said mold sections are in said closed position thereof, the forces necessary for counteracting the pressure of a blowing medium during the blow-molding of the synthetic plastic object and for actuating clamping means located above said motion-imparting means and operative for biasing said mold sections towards one another when or slightly before said mold sections have arrived at said closed position, said clamping means comprising two cooperating clamping parts each provided on a different one of said assemblies and projecting from the same toward the respective other assembly by a distance which is small enough for said clamping parts not to interfere with said free space and with the relative movement of said mold sections and said object in said direction when said mold sections are in said open position thereof.

2. A combination as defined in claim 1, said motion-imparting means including a motor, a first element directly coupling said motor with one of said assemblies, a second element indirectly coupling said motor with the other of said assemblies via a support means to which it is connected and said guide means connecting said support means with said other assembly; said clamping means comprising a tie rod having a fixed part mounted on said other assembly and a slidable part movably guided in said one assembly and in said support means having a locking portion on one end facing said fixed part and an abutment portion on its other end which engages said support means at least when said mold sections are in said closed position thereof, and elastic biasing means intermediate said one assembly and said locking portion and operative for permanently urging said slidable part towards said other assembly and said fixed part thereon, said fixed part and said locking portion projecting beyond the associated assembly and towards the respective other assembly by a distance which is small enough so that these parts do not interfere with said free space when said mold sections are in said open position.

3. A combination as defined in claim 2, said locking portion comprising clamping jaws adapted to engage said fixed part on said other mold sections, and means for moving said jaws into clamping engagement with said fixed part.

4. A combination as defined in claim 2, said fixed part having a turnable arresting portion, and said locking portion including a sleeve arrestably engageable with said arresting portion.

5. In a blow-molding unit for blow-molding synthetic plastic objects, a combination comprising a pair of assemblies, each including an upright mold section and a lower part below said mold section; guide means extending through at least one of said lower parts and being operative for guiding said assemblies in substantial parallelism toward and away from each other between a closed position in which said mold sections meet in an upright parting plane and confine a synthetic plastic object between themselves, and an open position in which said mold sections define between themselves a free space and in which free relative movement of said mold sections and of the object in a predetermined direction can occur so that the object is no longer confined between said mold sections; single motion-imparting means coupled with said assemblies located outside said free space above said guide means and operative for moving said assemblies between said open and closed positions of said mold sections and for producing, when said mold sections are in said closed position thereof, the forces necessary for counteracting the pressure of a blowing medium during the blow-molding of the synthetic plastic object and for actuating clamping means operative above said motion-imparting means for biasing said mold sections towards one another when or slightly before said mold sections have arrived at said closed position, said clamping means comprising an arresting portion provided on one of said assemblies and a pivotable member on a support coupled with said motion-imparting means and said one assembly, said member being pivotable from a locking position where said member is in arresting engagement with said arresting portion and extends wholly above said motion-imparting means and parallel to said guide means, and an open position where one end of said member is pivoted so as not to interfere with said free space and with the relative movement of said mold sections and said object in said direction when said mold sections are in said open position thereof, said arresting portion always being positioned outside said free space.

6. A combination as defined in claim 5, said support having an extension and said pivotable member being an arm pivotably mounted on said extension and having an engaging portion movable into and out of engagement with said arresting portion which comprises arresting jaws.

7. A combination as defined in claim 6; further comprising cooperating rack and gear means for pivoting said arm into engagement with said arresting portion in response to movement of said mold sections to said closed position.

8. A combination as defined in claim 7, said arm including an elongated first part and a second part movable lengthwise relative to said first part.

* * * * *